(12) United States Patent
Cantaloube

(10) Patent No.: US 10,911,298 B2
(45) Date of Patent: Feb. 2, 2021

(54) COMMUNICATION NETWORK, COMMUNICATION INSTALLATION WITHIN AN AIRCRAFT AND AIRCRAFT COMPRISING SUCH A COMMUNICATION INSTALLATION

(71) Applicant: THALES, Courbevoie (FR)

(72) Inventor: Christian Cantaloube, Toulouse (FR)

(73) Assignee: Thales, Courbevoie (FR)

( * ) Notice: Subject to any disclaimer, the term of this patent is extended or adjusted under 35 U.S.C. 154(b) by 456 days.

(21) Appl. No.: 15/085,500

(22) Filed: Mar. 30, 2016

(65) Prior Publication Data

US 2016/0294616 A1 Oct. 6, 2016

(30) Foreign Application Priority Data

Mar. 31, 2015 (FR) ...................................... 15 00647

(51) Int. Cl.
*H04L 12/40* (2006.01)
*H04L 12/24* (2006.01)
(Continued)

(52) U.S. Cl.
CPC .......... *H04L 41/0806* (2013.01); *G06F 11/00* (2013.01); *H04L 1/00* (2013.01);
(Continued)

(58) Field of Classification Search
CPC ............... H04L 49/00; H04L 12/40176; H04L 12/40182; H04L 1/00; H04L 2012/4028;
(Continued)

(56) References Cited

U.S. PATENT DOCUMENTS

2003/0202520 A1* 10/2003 Witkowski .......... H04L 12/5601
370/400
2006/0215568 A1* 9/2006 Smith .................... H04L 43/12
370/241
(Continued)

FOREIGN PATENT DOCUMENTS

CN 101924713 12/2010
CN 102427426 4/2012
CN 202455375 U 9/2012

OTHER PUBLICATIONS

Database EPODOC XP-002755045, Database accession No. CN-201220052113-U, The European Patent Office, The Hague, NL, dated Sep. 26, 2012.
(Continued)

*Primary Examiner* — Andrew Lai
*Assistant Examiner* — M Mostazir Rahman
(74) *Attorney, Agent, or Firm* — Knobbe, Martens, Olson & Bear, LLP

(57) ABSTRACT

A communication network, communication installation within an aircraft and aircraft including such a communication installation are disclosed. In one aspect, the network is adapted for interconnecting pieces of electronic equipment and includes a set of at least three network switches, each being connected to all of the other network switches of the set. Each network switch includes several communication ports. The network further includes a plurality of datalinks, each being configured to connect one network switch bidirectionally to another network switch of the set, via the corresponding communication ports. At least two separate network switches are configured to be connected directly to a same piece of electronic equipment.

18 Claims, 2 Drawing Sheets

(51) Int. Cl.
*H04L 29/06* (2006.01)
*G06F 11/00* (2006.01)
*H04L 12/701* (2013.01)
*H04L 1/00* (2006.01)
*H04L 29/08* (2006.01)
*H04L 12/931* (2013.01)
*H04L 12/707* (2013.01)

(52) U.S. Cl.
CPC .. *H04L 12/40176* (2013.01); *H04L 12/40182* (2013.01); *H04L 41/0663* (2013.01); *H04L 41/085* (2013.01); *H04L 45/00* (2013.01); *H04L 67/12* (2013.01); *H04L 69/14* (2013.01); *H04L 45/24* (2013.01); *H04L 49/00* (2013.01); *H04L 2012/4028* (2013.01)

(58) Field of Classification Search
CPC . H04L 41/0663; H04L 41/0806; H04L 45/00; H04L 45/24; H04L 67/12; H04L 69/14; H04L 12/40; H04L 41/00; H04L 41/085

See application file for complete search history.

(56) References Cited

U.S. PATENT DOCUMENTS

| | | | |
|---|---|---|---|
| 2011/0103268 A1* | 5/2011 | Mann | H04L 12/40169 370/276 |
| 2011/0154108 A1* | 6/2011 | Candia | H04L 49/201 714/25 |
| 2011/0251739 A1* | 10/2011 | Tomas | B64C 13/503 701/3 |
| 2012/0290692 A1* | 11/2012 | Reich | H04L 12/437 709/220 |
| 2014/0180504 A1* | 6/2014 | Fervel | H04L 12/6418 701/3 |
| 2014/0313943 A1* | 10/2014 | Lopez | H04L 5/14 370/276 |
| 2015/0271019 A1* | 9/2015 | Reich | H04L 41/0816 709/221 |
| 2015/0281130 A1* | 10/2015 | Lembcke | H04L 49/351 370/276 |

OTHER PUBLICATIONS

Search Report dated Mar. 4, 2016 for French Patent Application No. 15-00647 filed on Mar. 31, 2015.
Search Report dated May 5, 2017 for French Patent Application No. 16-52825 filed on Mar. 31, 2016.

* cited by examiner

COMMUNICATION NETWORK, COMMUNICATION INSTALLATION WITHIN AN AIRCRAFT AND AIRCRAFT COMPRISING SUCH A COMMUNICATION INSTALLATION

CROSS-REFERENCE TO RELATED APPLICATIONS

This patent application claims the benefit under 35 U.S.C. § 119 of French Application No. FR 15 00648 filed on Mar. 31, 2015 which is hereby incorporated by reference in its entirety.

BACKGROUND

1. Technological Field

The described technology generally relates to a communication network comprising several network switches, each network switch including several communication ports.

The described technology also generally relates to a set of such communication networks, each network switch on the network being connected to a respective network switch of each other network.

The described technology also generally relates to a communication installation comprising several pieces of electronic equipment and such a communication network or such a set of communication networks.

The described technology also generally relates to an aircraft comprising such a communication installation.

The described technology generally relates to the field of redundant communication networks, i.e. communication networks comprising several network switches and allowing several communication paths via different network switches. Such redundant networks allow the communication of data between two pieces electronic equipment connected to the communication network, despite the failure of one of the network switches.

The described technology more particularly relates to the field of avionics communication networks, installed onboard aircraft, comprising network switches that are then desirably according to standard aeronautical radio, incorporated (ARINC) 664.

2. Description of the Related Technology

A redundant avionics communication network is known, such a network comprising two communication chains, also called communication planes, arranged in parallel (or mirrored). Each communication chain includes one or several network switches, the network switches of each chain being connected to one another if applicable. Two successive network switches of a communication chain are connected to one another by a two-way datalink in order to allow a communication of data in both directions between the network switches.

The pieces of electronic equipment needing to communicate via this network of switches, also called subscriber equipment, are connected to a switch of each communication chain to obtain the communication redundancy via the two parallel chains. The number of network switches is desirably identical from one communication chain to another, and the communication network is then said to be mirrored, with its two communication chains in parallel including the same number of network switches. Such a mirrored network is, for example, an Avionics Full Duplex Switch Ethernet (AFDX) network with network switches according to standard ARINC 664.

However, such a communication network is particularly sensitive to the failure of one or more network switches. Indeed, a communication chain becomes inoperative once one of its network switches has failed, and the failure of two network switches may cause a total malfunction of the network, if these two network switches each belong to a respective communication chain.

SUMMARY OF CERTAIN INVENTIVE ASPECTS

One objective of the present disclosure is therefore to propose a communication network having better operating robustness in case of failure of one or more of its network switches.

To that end, the described technology relates to a communication network, adapted for interconnecting pieces of electronic equipment, the communication network comprising:
- a set of at least three network switches, each being connected to all of the other network switches of the set, each network switch including several communication ports, and
- a plurality of datalinks, each being configured to connect one network switch bidirectionally to another network switch of the set, via the corresponding communication ports,
- for each pair of separate network switches from among the set, the separate network switches being configured to be connected directly to a same piece of electronic equipment.

According to other advantageous aspects of the described technology, the communication network comprises one or more of the following features, considered alone or according to all technically possible combinations:
- each network switch is configured to transmit at least one message from an input port to an output port according to a configuration table of the connections between the network switches of the set, the input port and the output port each being formed by a communication port;
- the communication network further comprises a configuration module configured for determining the configuration table;
- the configuration module is configured for computing, via the configuration table of connections, first and second communication paths, each communication path passing through at least one network switch, the first communication path being separate from the second communication path, the network switch(es) associated with the first communication path being separate from the network switch(es) associated with the second communication path;
- the configuration module is configured to send the determined configuration table to each network switch;
- the configuration module is integrated into each network switch;
- the configuration table is predefined and stored in each network switch;
- all of this network switches of the set are identical; and
- each network switch is according to standard ARINC 664.

The described technology also relates to a set of communication networks, adapted for interconnecting pieces of electronic equipment, the set comprising a plurality of communication networks, in which each communication network is as defined above, and each network switch of a network is connected to a respective network switch of each other network.

The described technology also relates to a communication installation comprising several pieces of avionics equipment and a communication network or a set of communication networks, positioned between the pieces of avionics equipment, in which the communication network or the set of communication networks is as defined above.

According to other advantageous aspects of the described technology, the communication installation comprises one or more of the following features, considered alone or according to all technically possible combinations:

each piece of electronic equipment is connected to at least two separate network switches, via a respective one of its communication ports for each network switch; and
the communication installation is an avionics installation intended to be arranged onboard an aircraft, the pieces of electronic equipment being pieces of avionics equipment according to standard ARINC 664, and each network switch being according to standard ARINC 664.

The described technology also relates to an aircraft comprising a communication installation, in which the communication installation is as defined above.

BRIEF DESCRIPTION OF THE DRAWINGS

These features and advantages of the described technology will appear more clearly upon reading the following description, provided solely as a non-limiting example, and done in reference to the appended drawings, in which.

DETAILED DESCRIPTION OF CERTAIN INVENTIVE EMBODIMENTS

Figure 1:
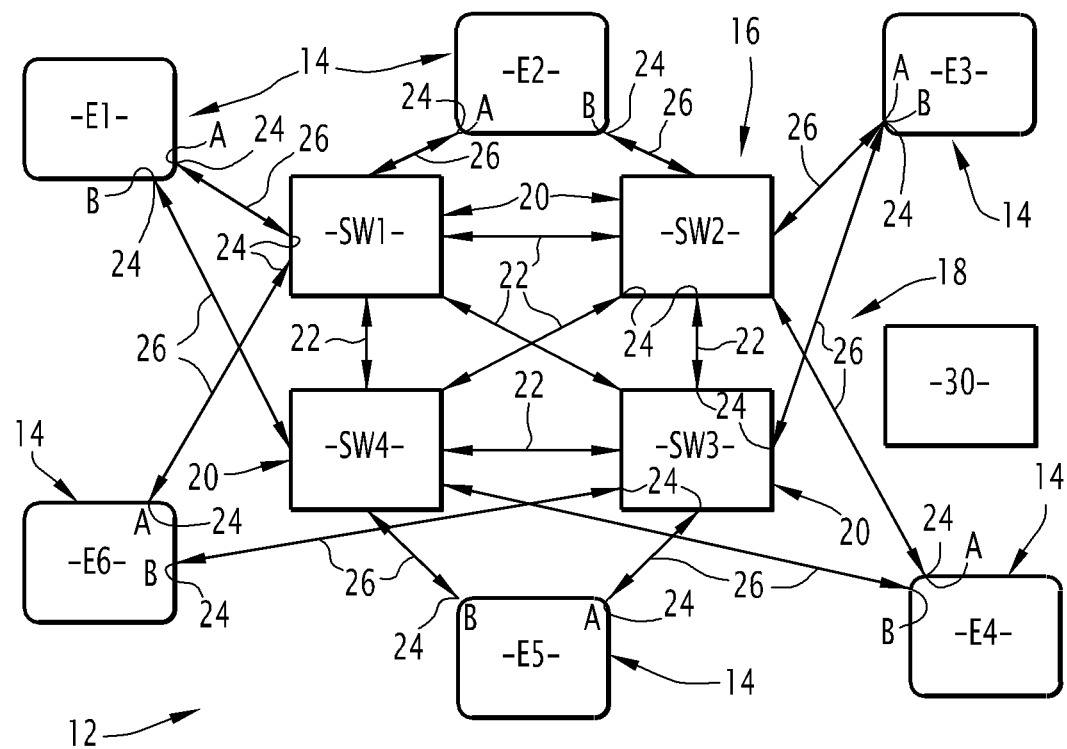
FIG. 1 is a diagrammatic illustration of an aircraft equipped with a communication installation comprising several pieces of avionics equipment and a communication network positioned between the pieces of avionics equipment, according to a first embodiment.

In FIG. 1, an aircraft 10 comprises a communication installation 12.

The communication installation 12 is designed to be arranged onboard the aircraft 10. Alternatively, the communication installation 12 is designed to be arranged onboard a vehicle, such as a rail vehicle, or a maritime vehicle, or a spatial vehicle (booster rocket, satellite, shuttle).

The communication installation 12 comprises several pieces of electronic equipment 14 and a communication network 16 positioned between the pieces of electronic equipment 14, the network 16 including a set 18 of at least three networks switches 20 and a plurality of datalinks 22 connecting the network switches 20.

The communication installation 12 is desirably an avionics installation intended to be arranged onboard the aircraft 10, and the pieces of electronic equipment 14 are then pieces of avionics equipment, desirably according to standard ARINC 664, each network switch 20 then also desirably being according to standard ARINC 664.

Each piece of electronic equipment 14 comprises at least two separate communication ports 24. In the example of FIG. 1, each piece of electronic equipment 14 has exactly two communication ports 24, i.e. a first communication port 24, also denoted A, and a second communication port 24, also denoted B.

Each piece of electronic equipment 14 is connected to at least two separate network switches 20, via a respective communication port 24 for each network switch 20.

The pieces of electronic equipment 14 are connected to the network switch 20 by datalinks 26 outside the communication network 16, the datalinks 22 then being called internal links. Each external datalink 26 is, for example, a bidirectional link allowing the transmission of data in both communication directions between the piece of electronic equipment 14 and the corresponding network switch 20, from one to the other, and vice versa.

Each piece of electronic equipment 14 is desirably a piece of equipment of an avionics system, for example comprising one or more of the following systems: viewing system, alert system, aircraft flight management system (FMS), global positioning system (GPS), inertial reference system (IRS), centralized maintenance or registration system, automatic pilot system. More generally, this can be any piece of electronic equipment onboard the vehicle, including pieces of control equipment for the onboard systems: engines, fuel, landing gear, braking, air conditioning, pressurization, fire detection.

In the example of FIG. 1, the different pieces of electronic equipment 14 are successively numbered E1, E2, E3, E4, E5 and E6, so as to be able to identify them relative to one another during the determination of communication paths between the different pieces of electronic equipment 14, as will be described in more detail later.

The communication network 16 comprises the set 18 of at least three network switches 20, and the plurality of datalinks 22. The communication network 16 further comprises a configuration module 30 configured for determining a configuration table of the connections between the network switches 20 of the set 18, such as table 1 or 2 defined below.

The communication network 16 is configured to interconnect the pieces of electronic equipment 14. The communication network 16 is desirably according to standard ARINC 664, each network switch 20 and the different datalinks 22 then being according to standard ARINC 664.

Figure 2:
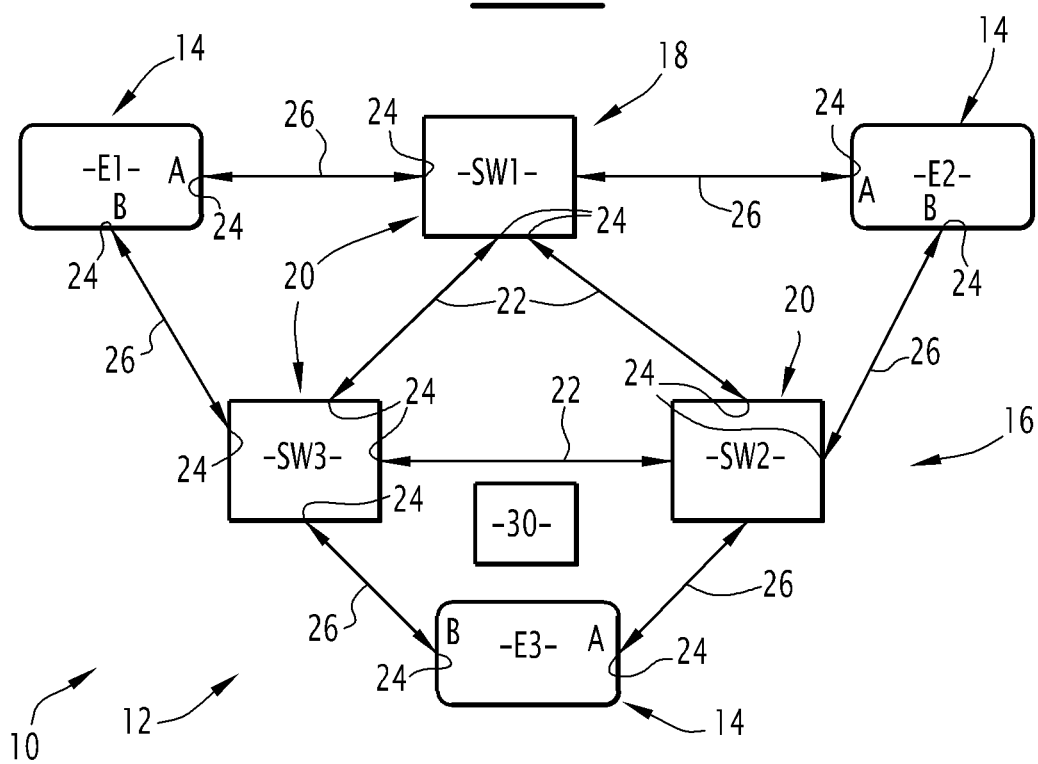
FIG. 2 is a view similar to that of FIG. 1 according to a second embodiment of the described technology.
Figure 3:
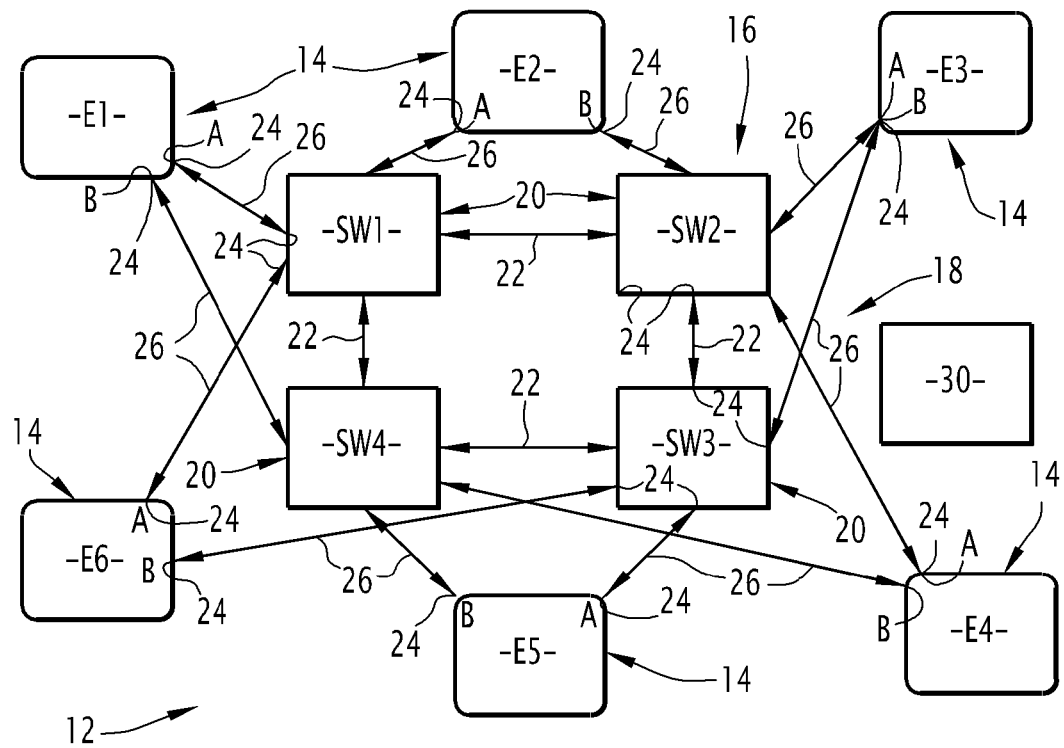
FIG. 3 is a view similar to that of FIG. 1 according to a third embodiment of the described technology.
Figure 4:
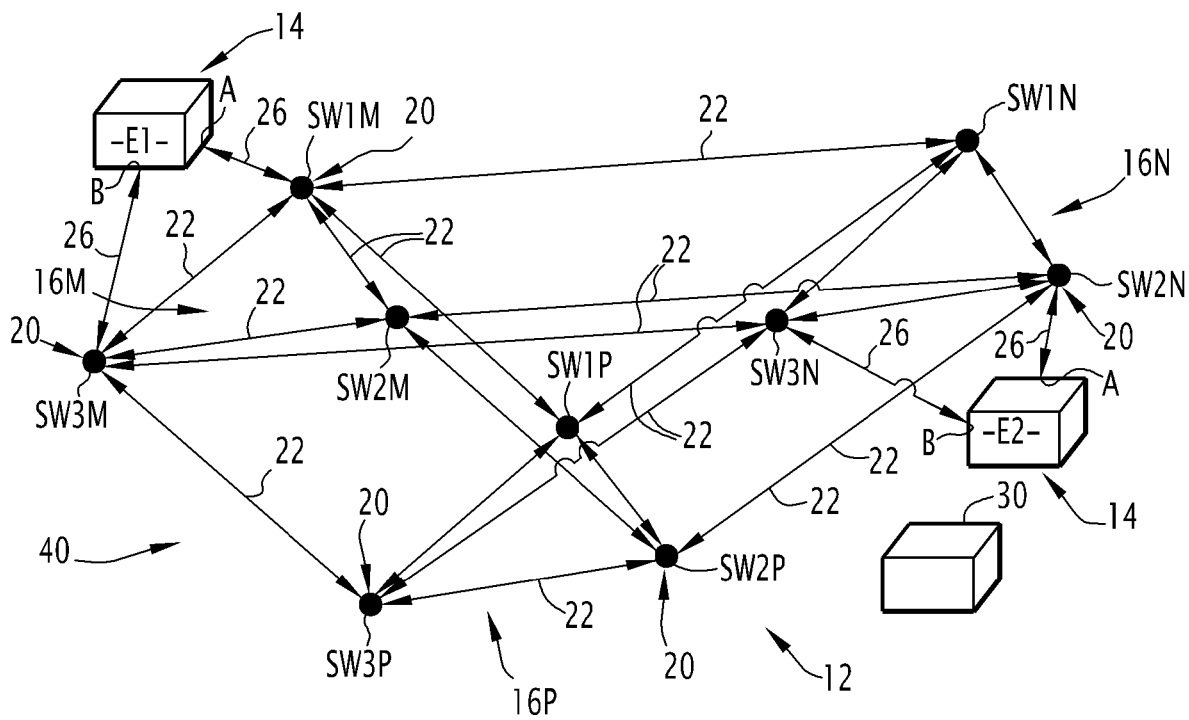
FIG. 4 is a diagrammatic illustration of an aircraft equipped with a communication installation comprising several pieces of avionics equipment and a set of three communication networks positioned between the pieces of avionics equipment.

Within the set 18, each network switch 20 is connected, directly as in the example of FIG. 1, 2 or 4 and indirectly as in the example of FIG. 3, to all of the other network switches 20 of the set, by means of datalinks 22.

At least two separate network switches 20 are configured to be connected directly to a same piece of electronic equipment 14, for each piece of electronic equipment 14 in order to have a redundant communication network 16. In other words, each piece of electronic equipment 14 is connected directly to at least two separate network switches 20 of the communication network 16.

Each network switch 20 is known in itself, and includes several communication ports 24, also called connection ports. Each network switch 20 is, for example, an Ethernet switch.

Each network switch 20 is then configured to transmit at least one message from an input port to an output port according to a configuration table of the connections between the network switches 20 of the set 18, the input port and the output port each being formed by a communication port 24.

All of the network switches 20 of the set 18 are, for example, identical. This then makes it possible to improve the interoperability of the communication network 16.

The number of network switches 20 of the set 18 is greater than or equal to 3, and desirably equal to 3 or 4. A number of network switches 20 equal to 3 (FIG. 2) or 4 (FIGS. 1 and 3) makes it possible to have a communication network 16 that is not very cumbersome or expensive, while offering good reliability, despite the potential failure of a network switch 20.

In the example of FIG. 1, the number of network switches 20 is equal to 4, and each network switch 20 includes at least six communication ports 24, three communication ports 24 being used to connect the network switch 20 to the other network switches 20 of the set 18, and the other communication ports 24 being used to connect that network switch 20 to pieces of electronic equipment 14. In this example of FIG. 1, for each network switch 20, at least three communication ports 24 are dedicated to the links with the pieces of electronic equipment 14, and each network switch 20 is then connected to at least three separate pieces of electronic equipment 14.

In the example of FIG. 1, the different network switches 20 are successively numbered SW1, SW2, SW3 and SW4, so as also to be able to identify them relative to one another during the determination of the different communication paths.

The datalinks 22 are configured to link a network switch 20 bidirectionally to another network switch 20 of the set 18, via the corresponding communication ports 24. Each datalink 22 is, for example, a bidirectional link linking a communication port 24 of one network switch 20 to a communication port 24 of another network switch 20. The datalink 22 is bidirectional when it allows the transmission of data between two network switches 20 in both communication directions, from one to the other and vice versa.

Each datalink 22, 26 is desirably an Ethernet link. In particular, each datalink 22, 26 is desirably according to standard ARINC 664.

Each datalink 22, 26 is desirably a wired link, such as an electrical link or a fiber-optic link. Each datalink 22, 26 is configured to allow a certain data throughput, for example comprised between 10 Mb/second and 10 Gb/second.

Within a network switch 20, each message received on a communication port 24, then called input port, is returned toward one or more other ports 24, then called output ports, of that same switch, based on the piece(s) of electronic equipment 14 receiving this message and according to the configuration table of the connections between the network switches 20. The definition of the connections between the network switches 20 and the transmission path of the messages within each of them makes it possible in fine to define the communication paths between the subscriber pieces of equipment 14.

Each communication port 24 is, for example, an Ethernet port, in particular a port according to standard ARINC 664.

The configuration module 30 is configured for determining the configuration table of the connections between the network switches 20 of the communication network 16. The configuration module 30 is then configured for computing, via the communication table, for each pair of pieces of electronic equipment 14, a first and second communication path between the two pieces of electronic equipment 14 of the pair, each communication path passing through at least one network switch 20.

In the example of FIGS. 1 to 4, the configuration module 30 is a separate module from the network switches 20. The configuration module 30 is then further configured to send the determined configuration table to each network switch 20. The configuration module 30 is connected to each of the network switches 20 by respective datalinks, not shown for clarity of the figures, these datalinks being wired links or wireless links.

In an alternative that is not shown, the configuration module 30 is integrated into each network switch 20.

Also alternatively, the configuration table is predefined using a tool outside the communication network 16. The configuration table is then stored in each network switch 20, prior to the implementation of the communication network 16. According to this alternative, the communication network 16 does not comprise a configuration module.

In order to have redundant communication, the first communication path is separate from the second communication path, the network switch(es) 20 associated with the first communication path being separate from the network switch(es) 20 associated with the second communication path.

As an optional addition, the configuration module 30, or the outside tool if applicable, is configured for still better computing the communication paths between two corresponding pieces of electronic equipment 14, i.e. at least three communication paths, to further increase the reliability of the communication network 16.

In general, the number of possible communication paths between two pieces of electronic equipment 14 depends on the number of communication ports 24 that each piece of electronic equipment 14 has, the number of network switches 20 of the set 18, and the datalinks 22, 26 positioned between these elements 14, 20.

The definition of the connections between the network switches 20 of the set is, for example, done using the configuration table, such as table 1 shown below and corresponding to the example of FIG. 1.

TABLE 1

| Transmitting port | Connected switch | Receiving port | | | | | | | | | | | |
|---|---|---|---|---|---|---|---|---|---|---|---|---|---|
| | | E1-A SW1 | E1-B SW4 | E2-A SW1 | E2-B SW2 | E3-A SW2 | E3-B SW3 | E4-A SW2 | E4-B SW4 | E5-A SW3 | E5-B SW4 | E6-A SW1 | E6-B SW3 |
| E1-A | SW1 | SW1 | | SW1 | | SW1 + SW2 | | SW1 + SW2 | | SW1 + SW3 | | SW1 | |
| E1-B | SW4 | | SW4 | | SW4 + SW2 | | SW4 + SW3 | | SW4 | | SW4 | | SW4 + SW3 |
| E2-A | SW1 | SW1 | | SW1 | | SW1 + SW2 | | SW1 + SW2 | | SW1 + SW3 | | SW1 | |
| E2-B | SW2 | | SW2 + SW4 | | SW2 | | SW2 + SW3 | | SW2 + SW4 | | SW2 + SW4 | | SW2 + SW3 |

TABLE 1-continued

| Transmitting port | Connected switch | Receiving port | | | | | | | | | | | |
|---|---|---|---|---|---|---|---|---|---|---|---|---|
| | | E1-A SW1 | E1-B SW4 | E2-A SW1 | E2-B SW2 | E3-A SW2 | E3-B SW3 | E4-A SW2 | E4-B SW4 | E5-A SW3 | E5-B SW4 | E6-A SW1 | E6-B SW3 |
| E3-A | SW2 | SW2 + SW1 | | SW2 + SW1 | | SW2 | | SW2 | | SW2 + SW3 | | SW2 + SW1 | |
| E3-B | SW3 | | SW3 + SW4 | | SW3 + SW2 | | SW3 | | SW3 + SW4 | | SW3 + SW4 | | SW3 |
| E4-A | SW2 | SW2 + SW1 | | SW2 + SW1 | | SW2 | | SW2 | | SW2 + SW3 | | SW2 + SW1 | |
| E4-B | SW4 | | SW4 | | SW4 + SW2 | | SW4 + SW3 | | SW4 | | SW4 | | | SW4 + SW3 |
| E5-A | SW3 | SW3 + SW1 | | SW3 + SW1 | | SW3 + SW2 | | SW3 + SW2 | | SW3 | | | | SW3 + SW1 |
| E5-B | SW4 | | SW4 | | SW4 + SW2 | | SW4 + SW3 | | SW4 | | SW4 | | | SW4 + SW3 |
| E6-A | SW1 | SW1 | | SW1 | | SW1 + SW2 | | SW1 + SW2 | | SW1 + SW3 | | SW1 | |
| E6-B | SW3 | | SW3 + SW4 | | SW3 + SW2 | | SW3 | | SW3 + SW4 | | SW3 + SW4 | | SW3 |

In table 1 above, each transmitting communication port 24 is identified by the number, from E1 to E6, of the piece of electronic equipment 14 to which it belongs, followed by the letter A or B making it possible to identify it from among the two communication ports of that piece of electronic equipment 14. The receiving communication port 24 is identified similarly with the number, from E1 to E6, of the piece of electronic equipment 14 to which it belongs, followed by the letter A or B.

The network switches 20 used for the different communication paths are also identified by their number SW1 to SW4, with the convention according to which SWi+SWj means that the communication path first passes through the network switch numbered SWi, then through the network switch numbered SWj, i and j being comprised between 1 and 4.

The architecture of the communication network 16 according to the described technology is thus a flat architecture, where all of the network switches 20 are interconnected with one another, instead of a network architecture of the standard technology with a distribution of the network switches in two parallel mirror planes.

With the architecture of the communication network 16 according to the described technology, each piece of electronic equipment 14 intended to be connected to the communication network 16 is next connected to at least two different network switches 20 by the set of network switches 20, in order to have at least two possible different communication paths with another piece of electronic equipment 14 also connected to the communication network 16.

A message sent redundantly by one piece of electronic equipment 14 via these two communication ports 24 is then conveyed via two different communication paths toward the receiving electronic equipment 14.

A traditional double reception mechanism of the other piece of electronic equipment 14 is then provided, the first valid message received being taken into account, and the second arriving redundant message being ignored when it is received.

One skilled in the art will note that the architecture of the communication network 16 according to the described technology makes it possible to increase the operating reliability, since for a same number of network switches 20 within the communication network 16, the number of pairs of different network switches 20 to which the pieces of electronic equipment 14 are able to be connected is higher with the architecture of the communication network 16 according to the described technology than with the architecture of the communication network according to the standard technology.

As an example, with four network switches 20, as in the example of FIG. 1, the number of pairs of different network switches 20 is then equal to 6, whereas with the architecture of the communication network according to the standard technology, there are two pairs of switches in parallel in that case.

With three network switches 20, as is described below for the second embodiment in light of FIG. 2, the number of pairs of different network switches 20 is equal to 3, and is still greater than that obtained in the case of the communication network of the standard technology, while the number of network switches 20 is lower in that case.

FIG. 2 illustrates a second embodiment in which the elements identical to the first embodiment previously described are identified using identical references, and are not described again.

According to this second embodiment, the number of network switches 20 of the set 18 is equal to 3, and the network switches 20 are then numbered SW1, SW2 and SW3.

Similarly to the first embodiment, each network switch 20 is connected to all of the other network switches 20 of the set 18, and the network switches 20 then form a triangle network.

According to this second embodiment, each network switch 20 includes at least four communication ports 24, two communication ports 24 making it possible to connect the network switch 20 to the two other network switches 20, and at least two other communication ports 24 making it possible to connect the network switch 20 to at least two separate pieces of network equipment 14.

In the example of FIG. 2, the communication installation 12 comprises three pieces of electronic equipment 14, then numbered E1, E2, E3. Similarly to the first embodiment, each piece of electronic equipment 14 is connected to at least two separate network switches 20, via a respective one of these communication ports 24 for each network switch 20, each network switch 20 including at least two communication ports 24.

In the example of FIG. 2, each piece of electronic equipment 14 has exactly two communication ports 24, respectively denoted A and B.

The configuration module 30 is also configured for computing at least two separate communication paths between two different pieces of electronic equipment 14, and defining the transmission of the message between the input port and the output port(s), to be done by each switch 20, on each message that passes through the switch 20.

The definition of the connections is, for example, done using the configuration table, like table 2 shown below, and corresponding to the example of FIG. 2.

FIG. 3 illustrates a third embodiment in which the elements identical to the first embodiment previously described are identified using identical references, and are not described again.

According to this third embodiment, each network switch 20 is connected to all of the other network switches 20 of the set 18, and each network switch 20 is not directly connected to all of the other network switches 20 via a corresponding datalink 22. As an example, the network switches having

TABLE 2

| Transmitting port | Connected switch | Receiving port | | | | | |
|---|---|---|---|---|---|---|---|
| | | E1-A SW1 | E1-B SW3 | E2-A SW1 | E2-B SW2 | E3-A SW2 | E3-B SW3 |
| E1-A | SW1 | SW1 | | SW1 | | SW1 + SW2 | |
| E1-B | SW3 | | SW3 | | SW3 + SW2 | | SW3 |
| E2-A | SW1 | SW1 | | SW1 | | SW1 + SW2 | |
| E2-B | SW2 | | SW2 + SW3 | | SW2 | | SW2 + SW3 |
| E3-A | SW2 | SW2 + SW1 | | SW2 + SW1 | | SW2 | |
| E3-B | SW3 | | SW3 | | SW3 + SW2 | | SW3 |

Similarly to the first embodiment, in table 2 above, a transmitting communication port 24 is identified by the number, among E1 to E3, of the piece of electronic equipment 14 to which it belongs, followed by the letter A or B, and the receiving communication port 24 is similarly identified by the number of the piece of electronic equipment 14, from among E1 to E3, followed by the letter A or B corresponding to be considered communication port 24 among the two communication ports of the corresponding piece of electronic equipment 14. The network switches 20 are also identified by their number, i.e. SW1, SW2 or SW3, with the same convention according to which SWi+SWj means that the communication path passes first through the network switch numbered SWi, then through the network switch numbered SWj, i and j being comprised between 1 and 3.

The operation of the communication installation 12 according to this second embodiment is similar to that of the communication installation according to the first embodiment, and is not described again.

The advantages of the communication installation 12 according to this second embodiment are similar to those of the first embodiment, and are not reiterated here.

According to this second embodiment, the lower number of network switches 20 further makes it possible to still further reduce the bulk of the communication network 16, as well as its cost.

numbers SW1 and SW3 are not directly connected to one another, and are connected by means of the network switch having number SW2, or by means of the network switch having number SW4. The network switches having numbers SW2 and SW4 are also not directly connected to one another, and are connected to one another by means of the network switch SW1 or the network switch SW3.

One skilled in the art will also note that in the example of FIGS. 1 and 2 respectively corresponding to the first and second embodiments, each network switch 20 is directly connected to all of the other network switches 20, via a corresponding datalink 22.

The operation of the communication installation 12 according to the third embodiment is similar to that of the communication installation according the first embodiment, aside from the configuration table, which differs significantly.

The definition of the connections between the network switches 20 of the set according to this third embodiment is, for example, done using the configuration table, like table 3 shown below and corresponding to the example of FIG. 3.

TABLE 3

| Transmitting port | Connected switch | Receiving port | | | | | | | | | | | |
|---|---|---|---|---|---|---|---|---|---|---|---|---|---|
| | | E1-A SW1 | E1-B SW4 | E2-A SW1 | E2-B SW2 | E3-A SW2 | E3-B SW3 | E4-A SW2 | E4-B SW4 | E5-A SW3 | E5-B SW4 | E6-A SW1 | E6-B SW3 |
| E1-A | SW1 | SW1 | | SW1 | | SW1 + SW2 | | SW1 + SW2 | | SW1 + SW2 + SW3 | | SW1 | |
| E1-B | SW4 | | SW4 | | SW4 + SW1 + SW2 | | SW4 + SW3 | | SW4 | | SW4 | | SW4 + SW3 |

TABLE 3-continued

| Transmitting port | Connected switch | Receiving port | | | | | | | | | | | |
|---|---|---|---|---|---|---|---|---|---|---|---|---|---|
| | | E1-A SW1 | E1-B SW4 | E2-A SW1 | E2-B SW2 | E3-A SW2 | E3-B SW3 | E4-A SW2 | E4-B SW4 | E5-A SW3 | E5-B SW4 | E6-A SW1 | E6-B SW3 |
| E2-A | SW1 | SW1 | SW1 | | SW1 | SW1 + SW2 | | SW1 + SW2 | | SW1 + SW2 + SW3 | | SW1 | |
| E2-B | SW2 | | SW2 + SW3 + SW4 | | SW2 | | SW2 + SW3 | | SW2 + SW3 + SW4 | | SW2 + SW3 + SW4 | | SW2 + SW3 |
| E3-A | SW2 | SW2 + SW1 | | SW2 + SW1 | | SW2 | | SW2 | | SW2 + SW3 | | SW2 + SW1 | |
| E3-B | SW3 | | SW3 + SW4 | | SW3 + SW2 | | SW3 | | SW3 + SW4 | | SW3 + SW4 | | SW3 |
| E4-A | SW2 | SW2 + SW1 | | SW2 + SW1 | | SW2 | | SW2 | | SW2 + SW3 | | SW2 + SW1 | |
| E4-B | SW4 | | SW4 | | SW4 + SW1 + SW2 | | SW4 + SW3 | | SW4 | | SW4 | | SW4 + SW3 |
| E5-A | SW3 | SW3 + SW4 + SW1 | | SW3 + SW4 + SW1 | | SW3 + SW2 | | SW3 + SW2 | | SW3 | | SW3 + SW4 + SW1 | |
| E5-B | SW4 | | SW4 | | SW4 + SW1 + SW2 | | SW4 + SW3 | | SW4 | | SW4 | | SW4 + SW3 |
| E6-A | SW1 | SW1 | SW1 | | SW1 | SW1 + SW2 | | SW1 + SW2 | | SW1 + SW2 + SW3 | | SW1 | |
| E6-B | SW3 | | SW3 + SW4 | | SW3 + SW2 | | SW3 | | SW3 + SW4 | | SW3 + SW4 | | SW3 |

One skilled in the art will of course understand that other configuration tables may be considered in the example of FIG. 3, in particular favoring a transmission of the messages in the trigonometric direction between network switches SW1 and SW3 and between network switches SW2 and SW4; table 3 having been obtained from table 1 by favoring a transmission of messages in the anti-trigonometric direction between network switches SW1 and SW3 and between network switches SW2 and SW4.

The advantages of the communication installation 12 according to this third embodiment are similar to those of the first embodiment, and are not reiterated here.

According to this third embodiment, the lower number of datalinks 22 further makes it possible to significantly reduce the bulk of the communication network 16, as well as its cost, but the communication installation 12 according to this third embodiment is, however, more sensitive to a potential malfunction of a network switch 20, some of the paths between two pieces of subscriber equipment 14 passing through three separate network switches 20 according to table 3, while the paths between two pieces of subscriber equipment 14 according to table 1 pass through no more than two different network switches 20.

FIG. 4 illustrates a fourth embodiment in which the elements identical to the first embodiment previously described are identified using identical references, and are not described again.

According to this fourth embodiment, the communication installation 12 comprises several pieces of electronic equipment 14 and a set 40 of communication networks 16, the set 40 being positioned between the pieces of electronic equipment 14.

In FIG. 4, for simplification of the drawing, the network switches 20 have been shown in periodic form, and only two pieces of electronic equipment 14, numbered E1, E2, are visible.

The set 40 includes at least two pieces of network equipment 16. In the example of FIG. 4, the set 40 includes three communication networks 16, i.e. a first network 16M, a second network 16N and a third network 16P.

Each network 16 includes, similarly to the other embodiments previously described, at least three network switches 20 and a plurality of datalinks 22 connecting the network switches 20.

In the example of FIG. 4, the three network switches 20 of the first network 16M are successively numbered SW1M, SW2M and SW3M, the three network switches 20 of the second network 16N are successively numbered SW1N, SW2N and SW3N, and the three network switches 20 of the third network 16P are successively numbered SW1P, SW2P and SW3P.

Each network switch 20 of the network 16 is connected to a respective network switch 20 of each other network 16. In the example of FIG. 4, each network switch 20 of a network is directly connected to a respective network switch 20 of another network 16 by datalinks 22.

In this example, each network switch including a given figure, from among '1', '2' and '3', in its number is connected directly to the other network switches comprising the same figure in their number. In other words, the network switches SW1M, SW1N and SW1P are directly connected to one another by datalinks 22, the network switches SW2M, SW2N and SW2P are also directly connected to one another, and the network switches SW3M, SW3N and SW3P are also directly connected to one another.

The communication installation 12 is desirably an avionics installation intended to be arranged onboard the aircraft 10, and the pieces of electronic equipment 14 are then pieces of avionics equipment, desirably according to standard ARINC 664, each network switch 20 then also desirably being according to standard ARINC 664.

The operation of the communication installation 12 according to this fourth embodiment is similar to that of the communication installation according to the first embodiment, and is not described again.

The advantages of the communication installation 12 according to this fourth embodiment are similar to those of the first embodiment, and are also not reiterated here.

According to this fourth embodiment, the communication installation 12 makes it possible to increase the number of pieces of electronic subscriber equipment 14, to produce a more complex system.

One can thus see that the communication installation 12 and the communication network 16 according to the described technology make it possible to have better operating reliability in case of failure of at least one of the network switches, or even to decrease the number of network switches 20 when it is equal to 3, as for the communication installation 12 according to the second embodiment.

As previously described, the number of pairs of different network switches 20 to which the pieces of electronic equipment 14 can be connected is higher with the architecture of the communication network 16 according to the described technology than with the architecture of the communication network according to the standard technology, and one skilled in the art will note that in each of the embodiments previously described and in each of FIGS. 1 to 3, for each pair of different network switches 20 chosen from among the set 18 of network switches 20, the different network switches 20 of the pair are configured to be connected directly to a same piece of electronic equipment 14, i.e. a single piece of electronic equipment 14.

In other words, for any pair of different network switches 20 chosen from the set 18 of network switches 20, the two different network switches 20 forming the pair are configured to be connected directly to a same piece of electronic equipment 14, i.e. a single piece of electronic equipment 14.

In the example of FIG. 1, the number of pairs of different network switches 20 is equal to 6, as previously indicated, and the 6 possible pairs are the following: (SW1, SW2), (SW1, SW3), (SW1, SW4), (SW2, SW3), (SW2, SW4) and (SW3, SW4). For each of these 6 pairs, the two different network switches 20 forming the pair are configured to be connected directly to a same piece of electronic equipment 14, i.e. to a single piece of electronic equipment 14, i.e. the piece of equipment E2 for the pair (SW1, SW2), the piece of equipment E6 for pair (SW1, SW3), the piece of equipment E1 for pair (SW1, SW4), the piece of equipment E3 for pair (SW2, SW3), the piece of equipment E4 for pair (SW2, SW4) and the piece of equipment E5 for pair (SW3, SW4), as shown in FIG. 1.

In the example of FIG. 2, the number of pairs of different network switches 20 is equal to 3, as previously indicated, and the 3 possible pairs are the following: (SW1, SW2), (SW1, SW3) and (SW2, SW3). For each of these 3 pairs, the two different network switches 20 forming the pair are configured to be connected directly to a same piece of electronic equipment 14, i.e. to a single piece of electronic equipment 14, i.e. the piece of equipment E2 for pair (SW1, SW2), the piece of equipment E1 for pair (SW1, SW3) and the piece of equipment E3 for pair (SW2, SW3), as shown in FIG. 2.

In the example of FIG. 3, the number of pairs of different network switches 20 is equal to 6, similarly to FIG. 1, and the 6 possible pairs are the following: (SW1, SW2), (SW1, SW3), (SW1, SW4), (SW2, SW3), (SW2, SW4) and (SW3, SW4). For each of these 6 pairs, the two different network switches 20 forming the pair are configured to be connected directly to a same piece of electronic equipment 14, i.e. to a single piece of electronic equipment 14, i.e. the piece of equipment E2 for pair (SW1, SW2), the piece of equipment E6 for pair (SW1, SW3), the piece of equipment E1 for pair (SW1, SW4), the piece of equipment E3 for pair (SW2, SW3), the piece of equipment E4 for pair (SW2, SW4) and the piece of equipment E5 for pair (SW3, SW4), as shown in FIG. 3.

As previously indicated, this then makes it possible, for a same number of network switches 20 within the communication network 16, to increase the operating reliability of the communication network 16 relative to the communication network of the standard technology. This improved reliability is due to better redundancy between the different network switches 20 of the set 18, each network switch 20 having a redundant network switch 20 within the set 18, i.e. the other network switch 20 of the pair of network switches 20 connected directly to the same piece of electronic equipment 14. Furthermore, there are at least two pieces of electronic equipment 14 connected to a same network switch 20, for which the network switch 20 that is redundant with the network switch 20 varies from one piece of electronic equipment 14 to another. One skilled in the art will further observe that in the example of FIGS. 1 to 3, for each pair of pieces of electronic equipment 14 with the two pieces of electronic equipment 14 of the pair connected to a same network switch 20, the network switch 20 that is redundant with the same network switch 20 varies from one piece of electronic equipment 14 to the other of the pair.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A communication network adapted for interconnecting a plurality of pieces of electronic equipment on board an aircraft, the communication network comprising:
   a set of at least three network switches, each of the network switches being connected to all of the other network switches of the set, directly or via another network switch, each of the network switches including several communication ports, each of the network switches being positioned between the pieces of electronic equipment, and
   a plurality of bidirectional datalinks, each of the datalinks being configured to connect one of the network switches to another of the network switches of the set via the corresponding communication ports,
   for each and every pair of separate network switches from among the set, the separate network switches being configured to be connected directly to a single same one of the pieces of electronic equipment.

2. The communication network according to claim 1, wherein each network switch is configured to transmit at least one message from an input port to an output port according to a configuration table of the connections between the network switches of the set, the input port and the output port each being formed by a communication port.

3. The communication network according to claim 2, wherein the communication network further comprises a. configuration module that generates the configuration table.

4. The communication network according to claim 3, wherein the configuration module is configured to compute, via the configuration table of connections, first and second communication paths, each communication path passing through at least one network switch, the first communication path being separate from the second communication path, the network switch(es) associated with the first communication path being separate from the network switch(es) associated with the second communication path.

5. The communication network according to claim 3, wherein the configuration module is configured to send the configuration table to each network switch.

6. The communication network according to claim 3, wherein the configuration module is integrated into each network switch.

7. The communication network according to claim 2, wherein the configuration table is predefined and stored in each network switch.

8. The communication network according to claim 1, wherein all of the network switches of the set are identical.

9. The communication network according to claim 1, wherein each network switch conforms to standard Aeronautical Radio, Incorporated (ARINC) 664.

10. A set of communication networks adapted for interconnecting pieces of electronic equipment, the set comprising a plurality of communication networks,
wherein each communication network is according to claim 1, and
wherein each network switch of a network is connected to a respective network switch of each other network.

11. A communication installation, comprising:
a plurality of pieces of electronic equipment; and
a communication network positioned between the pieces of electronic equipment,
wherein the communication network is according to claim 1.

12. The communication installation according to claim 11, wherein each piece of electronic equipment is connected to at least two separate network switches, via a respective one of its communication ports for each network switch.

13. The communication installation according to claim 11, wherein the communication installation is an avionics installation intended to be arranged onboard an aircraft, the pieces of electronic equipment being pieces of avionics equipment conforming to standard Aeronautical Radio, Incorporated (ARINC) 664, and each network switch conforming to standard ARINC 664.

14. An aircraft comprising a communication installation, wherein the communication installation is according to claim 13.

15. A communication installation, comprising:
a plurality of pieces of electronic equipment; and
a set of communication networks positioned between the pieces of electronic equipment,
wherein the set of communication networks is defined by claim 10.

16. The communication installation according to claim 15, wherein each piece of electronic equipment is connected to at least two separate network switches via a respective one of its communication ports for each network switch.

17. The communication installation according to claim 15, wherein the communication installation is an avionics installation intended to be arranged onboard an aircraft, the pieces of electronic equipment being pieces of avionics equipment according to standard Aeronautical Radio, Incorporated (ARINC) 664, and each network switch being according to standard ARINC 664.

18. An aircraft comprising a communication installation, wherein the communication installation is according to claim 15.

* * * * *